United States Patent [19]

Cooper, Jr. et al.

[11] Patent Number: 5,134,032

[45] Date of Patent: Jul. 28, 1992

[54] ABRASIVE PARTICLE AND ROTARY SEAL THEREWITH

[75] Inventors: Ernest B. Cooper, Jr.; Eric J. Whitney; Thomas E. Mantkowski, all of Cincinnati, Ohio

[73] Assignee: General Electric Company, Cincinnati, Ohio

[21] Appl. No.: 660,208

[22] Filed: Feb. 25, 1991

[51] Int. Cl.⁵ .............................................. B32B 15/02
[52] U.S. Cl. .................................. 428/403; 428/404; 51/295; 51/309
[58] Field of Search ............... 51/295, 309; 415/174.4; 416/224; 219/121.65; 428/404, 403

[56] References Cited

U.S. PATENT DOCUMENTS

| | | | |
|---|---|---|---|
| 3,339,933 | 9/1967 | Foster | 415/174.4 |
| 4,232,995 | 11/1980 | Stalker et al. | 415/173.4 |
| 4,299,860 | 11/1981 | Schaefer et al. | 416/224 |
| 4,300,474 | 11/1981 | Livsey | 219/121.65 |
| 4,501,786 | 2/1985 | Hale | 51/295 |
| 4,730,093 | 3/1988 | Mehta et al. | 219/121.65 |
| 4,951,427 | 8/1990 | St. Pierre | 51/295 |

*Primary Examiner*—Karl Group
*Assistant Examiner*—Deborah Jones
*Attorney, Agent, or Firm*—Jerome C. Squillaro; Carmen Santa Maria

[57] ABSTRACT

An abrasive particle, for use in a manufacturing method in which the particle is exposed to a high energy beam, such as a laser, is provided with an abrasive core having an enclosing coating which protects the core from detrimental deterioration during exposure to the beam. In one form, the coating is multilayer.

The particle is included on a surface of a member of a rotary seal for abrading an opposing surface.

11 Claims, No Drawings

ABRASIVE PARTICLE AND ROTARY SEAL THEREWITH

This invention relates to abrasive particles, and, more particularly, to an abrasive particle protected from exposure to a laser beam and to a rotary seal made with such particle.

BACKGROUND OF THE INVENTION

In a gas turbine engine, generally fluids such as air entering the inlet and passing through the compression section, and products of combustion downstream of the combustion section, are not intended to deviate from designed flow paths. Such unintended leakage can result in seriously reduced engine efficiency. Accordingly, a variety of types of sealing arrangements are included throughout the engine, for example associated with shrouds, shafts and blading members.

One reported sealing arrangement involves the application of abrasive particles to one of opposing seal members. The particles allow that member to abrade an opposing surface during engine operation as a result of differences in thermal expansion characteristics of the opposing members or as a result of designed deflection of parts. The results are intended to either minimize fluid flow through such a seal or to regulate flow by a known amount. Typical U.S. patents disclosing articles of this type include U.S. Pat. No. 3,339,933 - Foster, issued Sep. 5, 1967, and U.S. Pat. No. 4,232,995 - Stalker, et al, issued Nov. 11, 1980, for example for use in rotary fluid seals.

A variety of types of abrasive particles and methods of applications also have been described. One of the more recent type of method involves generating a weld pool on a relatively moving article substrate, using a high energy beam such as a laser, and then depositing particles, such as an abrasive, in the weld pool either within or downstream of the laser beam. U.S. Pat. No. 4,299,860 - Schaefer et al, issued Nov. 10, 1981, discloses one such method. Other patents such as U.S. Pat. No. 4,730,093 - Mehta et al., issued Mar. 8, 1988, and U.S. Pat. No. 4,300,474 - Livsey, issued Nov. 17, 1981, describe apparatus for conducting such methods. The disclosures of all of the above identified patents are hereby incorporated herein by reference.

An abrasive particle often used in such sealing arrangements is an oxide, typically an oxide of Hf, Al, Zr, Mg, Ta, Cr, Y, etc., used alone or in combinations or mixtures. In such arrangements, a single layer of abrasive particles is of insufficient thickness or intensity to provide the desired long term sealing relationship. In such cases, multiple successive applications of the abrasive particles are required to be made, and the previously applied particles are exposed to the high energy beam used for application, such as a laser beam. It has been observed that beams such as laser beams will decompose oxides such as alumina which, when compared with the metal substrate, is a preferential absorber of laser beams. Therefore, more than a single application of such abrasive material, even if made originally outside of the laser beam, substantially will destroy the previously applied oxide particle when exposed to the laser beam.

SUMMARY OF THE INVENTION

The present invention, in one form, provides an improved abrasive particle for use in a manufacturing method in which the particle is exposed to a high energy beam, for example a laser beam. The particle comprises a core abrasive which is resistant to oxidation in an intended operating environment, and a coating substantially enclosing the core, the coating having the capability to protect the core from the beam in an amount sufficient to avoid detrimental deterioration of the core during exposure to the beam. Also, the coating is compatible with a selected substrate or matrix intended to be melted by a laser beam.

In a more specific form, such improved particle has a multilayer coating comprising an inner layer which, when melted, will wet the core, for example Ti or Nb. The particle has an outer layer, for example a carbide or a different metal, substantially enclosing the inner layer and which is characterized by the capabilities of being compatible with both the inner layer and a matrix in which the particle is intended to be entrapped, to bond therebetween, and of protecting the core from the high energy beam in an amount sufficient to avoid detrimental deterioration of the core during subsequent exposure to the beam.

Still another form of the invention is a rotary seal having juxtaposed rotating and stationary members having portions cooperating in a fluid sealing or fluid regulating arrangement, one of the members having disposed on a cooperating portion a plurality of bonded, superimposed strata of the above described particles.

DESCRIPTION OF THE PREFERRED EMBODIMENTS

A high energy beam in the form of a laser beam, typically in the range of 1-15 microns wavelength, has been used in the melting of an article surface to generate a weld pool into which are disposed abrasive particles. For example, a commonly used $CO_2$ laser operates in about a 10 micron wavelength range and a YAG laser operates in about a 1 micron wavelength. A narrow beam such as from a laser is especially useful in such deposition of abrasive particles on the relatively narrow tips of gas turbine engine turbine blades, compressor blades and knife edge seals.

Because of its oxidation resistance at turbine blade operating conditions, as well as abrasiveness, high temperature oxides are one preferred choice for abrasive particles for such application. However, preferred oxides such as of Hf, Y, Al, Zr, Ce, Ta, Cr, Mg and their mixtures and combinations preferentially absorb the laser radiation. For example, they are approximately only about 5-20% reflective of a laser beam, such as a $CO_2$ laser, of intensity adequate to melt a metal substrate or matrix material. Accordingly, exposure of such oxides to such laser beam will cause detrimental deterioration, such as melting or decomposition, of the oxide. One method of avoiding such exposure has been to deposit the oxide in a weld pool downstream or out of the scope of the melting laser beam. This is useful for application of a single layer of abrasive. However, when multiple layers of abrasive are required to develop a desired abrasive build-up, deposition of subsequent layers exposes the previously deposited abrasive particles to the laser beam, resulting in detrimental particle deterioration. The present invention, in one form, provides an abrasive particle which can be exposed without detrimental damage to a metal-melting laser beam, as in the deposition of multiple or superimposed layers of abrasive on a substrate or underlying matrix.

During evaluation of the present invention, it was recognized that, although oxides are one preferred form of abrasive for stable, long time use in a gas turbine hot section, they were difficult to entrap in a metal matrix. It was seen that it was difficult for the melted matrix or substrate to wet this oxide particle sufficiently to enable entrapment. Therefore, for application of oxide abrasive particles using a high energy beam such as a laser in a multiple exposure method, two of the problems present were protecting the abrasive particle from the laser beam, and wetting the particle sufficiently to enable its entrapment in a laser weld pool. It should be understood that an oxide is used herein to represent an abrasive particle which is resistant to oxidation in an intended high temperature operating environment, such as exists in the turbine section of a gas turbine engine.

Typical oxides which can be used as abrasives in such an environment includes $Al_2O_3$, $HfO_2$, $ZrO_2$, $Y_2O_3$, $Ta_2O_5$, MgO, oxides of Cr and Ce and their mixtures and combinations. Often, such oxides are combined to improve high temperature properties. Therefore, for some evaluations of the present invention, the stabilized mixture of $HfO_2$ with 5-10 wt % $Y_2O_3$ was used as an example of an abrasive. According to the present invention, such oxide combination was the core of an abrasive particle having a laser reflecting coating.

As was mentioned above, the laser reflecting coating also must have the characteristics of reacting with or wetting the core abrasive and of being compatible with a selected substrate of matrix intended to be melted by the laser beam to form a molten pool. When using the above mentioned typical high temperature resistant oxide abrasives, highly reactive metals such as Ti, Zr, Nb, Hf, V, Ta and their alloys and mixtures can be used as a coating portion to wet the abrasive core.

Application of such core-wetting coating to the abrasive core can be made in a variety of methods. In one evaluation, $HfO_2$, having 5-10 wt % $Y_2O_3$, a commercially available mixture, was mechanically mixed with $TiH_2$ powder and bound together using an acrylic binder. This mixture was then mixed with PS6MY powder. PS6MY is a proprietary alloy of General Electric Company having a nominal composition in weight percent, of 4% Co, 9% Cr, 6% Al, 1.5% Mo, 5% Ta, 4.5% W, 1.5% Re, 0.9% Hf, 0.05% C, 0.015 B, 0.3 Y and the balance Ni. The powder combination mixture was then preplaced on a Ni base superalloy substrate Deposition of such a powder combination mixture in a laser weld pool resulted in particle wetting and entrapment of the abrasive core.

Subsequent coatings of Ti, having similar oxide wetting and laser weld pool entrapping characteristics, were applied to an abrasive powder mixture of $HfO_2$, having 5-10 wt % $Y_2O_3$ particles in the well known fluidized bed method wherein the Ti was applied by chemical vapor deposition with the Ti in the form of a gaseous compound. The gas distributor was positioned in a furnace for coating at a temperature of between about 1800° F. to 2300° F. The final Ti coating in this example was uneven, but had thicknesses up to about 7 microns.

Successful wetting and entrapment of both of the above coated abrasive particles were accomplished in a $CO_2$ laser weld pool in an argon dry box on a substrate of commercially available IN718 nickel base superalloy downstream of the laser. However, after a second pass, under the laser, the oxides were consumed. Thus the Ti coatings alone, in the thicknesses due to their non-uniformity provided, though their wetting characteristics were adequate, did not exhibit adequate shielding of the laser to protect the oxide abrasive core from detrimental deterioration. The Ti coatings are themselves highly reactive even at the low levels of oxygen in an argon dry box.

In order to enhance the capability of protecting the core from multiple exposures to a high energy beam such as a laser, a multilayer coating was provided. Over the above described abrasive core and inner layer of Ti or Nb, applied as in the above examples, there was applied an outer layer of a second material. Such material is compatible with and will react with or wet the inner layer and, in addition, has the capability to protect the core from detrimental exposure to the laser beam during multiple exposures to the beam. The second material which comprises the outer coating can be selected from a variety of materials, generally those included as an element or combination of elements in the substrate in which the abrasive is intended to be entrapped. For example, in a Ni-base superalloy, for example IN718 alloy, the outer coating can be selected from Ni, Co, Cr, W, Re, Fe, Al, Mo and their mixtures and alloys.

It has been reported that carbides such as of W, Nb, Ti, Si, Ta, etc., suggested for use as abrasives in sealing arrangements, lack the stability required for long time use under the strenuous environmental conditions experienced in the turbine section of a gas turbine engine. However, in this multiple coating form of the present invention, it has been recognized that an outer coating of a carbide, being highly reflective of a laser beam, can be used as a laser beam reflector layer during the initial manufacture or subsequent repair of a member of a high temperature fluid seal. In this embodiment, the carbide, after performing its laser-reflecting function, is in the nature of a sacrificial coating, being allowed to oxidize away during high temperature operation in which it no longer is required. Therefore, one form of the present invention provides a carbide as the outer coating for its laser-reflecting characteristics. Typically the carbide coating has a thickness of about 1-50 microns.

A tungsten carbide, WC, coating is applied to an abrasive core of the above described $HfO_2$, 5-10 wt. % $Y_2O_3$. The carbide is applied to the above described abrasive core in a single fluidized bed reactor in a two step process. The first or inner layer, for example of Ti or Nb, is applied from a first gaseous compound such as $TiCl_4$ as described above, then the carbide is applied as an outer layer from a second gaseous compound such as methane, $CH_4$ over the inner layer. In this evaluation, a WC coating is applied in this way using $WF_6+CH_4+H_2$ as the gas to provide a uniform WC outer coating of about 1 micron in thickness.

EXAMPLE I

In one evaluation of a carbide as an outer, laser-reflecting coating according to the present invention $HfO_2$ 5-10% (−150+270 mesh) was mechanically mixed with $TiH_2$ powder (−325 mesh) in a 1:1 ratio by volume. This mixture was then further mixed with an acrylic binder. The acrylic binder was allowed to dry forming a hardened agglomerate. The agglomerate was then crushed to reform a powder. Inspection of the reformed powder at 30-100X magnification showed a large fraction of $TiH_2$ particles bound to $HfO_2$ 5-10% $Y_2O_3$ particles. The reformed powder was mechanically mixed with PS6MY (−270 mesh) powder in a 1:1 ratio by volume. This mixture comprising of $TiH_2$ particles bound to $HfO_2$ 5–10% $Y_2O_3$ particles and PS6MY was preplaced on an IN718 substrate to a thickness of approximately 0.050 inches. The preplaced powder mixture was then exposed to a $CO_2$ laser beam operating at 10.6 microns. The mixture was melted and fused to the IN718 substrate. Metallographic examination of the fused material showed $HfO_2$ completely entrapped in PS6MY.

In the above description, oxides were used as an example of the core of the particle of the present invention. However, it should be understood that protective coatings as described can be applied to other high temperature abrasive particles such as BN, TiN, $TiB_2$, etc. Therefore, although the present invention has been described in connection with specific examples and embodiments, they are intended to be typical of, rather than in any way limiting on the scope of the present invention. Those skilled in the art will recognize the inventions extent and potential variations within the scope of the appended claims.

EXAMPLE II

In this evaluation, $HfO_2$ - 5% $Y_2O_3$ oxide particles were coated in a fluidized bed with titanium. The abrasive was screened −150+270 mesh size and placed in a small laboratory fluidized bed coater. The particles were fluidized with argon during preheat to 1400° F., at which time the fluidizing gas was changed to hydrogen. The reactor was then preheated to 1850° F., at which time reactant, $TiCl_4$, was introduced. The reactant was contained in a bubbler arrangement and was heated to 130° F. to increase its vapor pressure. The fluidizing hydrogen was then bubbled through the $TiCl_4$ to entrain $TiCl_4$ vapors and passed to the fluidized bed where they were heated to the reaction temperature. The coating run was for 4 hours, after which the particles were cooled under argon to room temperature. The resulting coating was uneven and incomplete due to the relatively low coating temperature, but was several microns thick in some areas.

Subsequent laser welding trials with this coated abrasive on an IN718 substrate with IN718 matrix powder resulted in single pass welds with a large number of entrapped oxide particles included in the weld.

EXAMPLE III

In this evaluation, a carbide coating was deposited onto −150+270 mesh $HfO_2$ - $Y_2O_3$ powder in the same fluidized bed reactor used in Example II. The particles were again preheated under argon to 1400° F., preheated from 1400°–1850° F. under hydrogen and then reactant was introduced. In this case, a premixed cylinder of $H_2$ containing 1% $CH_4$ was used as the fluidizing gas, and was mixed 99:1 with $WF_6$ gas from a second cylinder. When heated to reaction temperature the $CH_4$ and $WF_6$ combined to form WC on the surface of the oxide particles. Time did not allow for weld testing with this material.

We claim:

1. An abrasive particle for use in a manufacturing method, in which the particle is exposed to a high energy beam, the particle comprising:

an abrasive oxide core which is resistant to oxidation in an intended operating environment of the particle; and a reactive metal alloy coating substantially enclosing the core, the coating having sufficient thickness to protect the core from detrimental deterioration, upon exposure to the beam, and which will become molten upon sufficient exposure to the beam.

2. The particle of claim 1 ion which the coating is bonded to the core, the coating being compatible with a substrate selected from the group consisting of metals and metal matrices to which the particle is attached during the manufacturing method and the core being entrapped in the molten substrate and coating upon sufficient exposure to the beam.

3. The particle of claim 2 in which:
the beam is a laser beam capable of melting the substrate; and,
the coating has the capability to protect the core from at least about 75% of the laser beam reaching the core during a plurality of exposures of the particle to the laser beam.

4. The particle of claim 2 wherein the coating is deposited by fluidized bed chemical vapor deposition.

5. The particle of claim 3 in which the core is an oxide stable at an intended operating oxidation environment of at least about 1000° F. and is selected from the group consisting of oxides of Hf, Y, Al, Ce, Cr, Zr, Ta, Mg, and their mixtures and combinations.

6. The particle of claim 5 in which the core comprises $HfO_2$ thermally stabilized with $Y_2O_3$.

7. The particle of claim 1 in which the coating is a multilayer coating comprising:
an inner metallic layer bonded with the core; and,
an outer layer selected from the group consisting of metals, metal alloys and metal carbides substantially enclosing the inner layer and which:
a) will bond with a selected substrate in which the particle is intended to be entrapped during beam melting of the selected substrate; and
b) has the capability to protect the core from the beam in an amount which avoids detrimental deterioration of the core during exposure to the beam during the beam melting.

8. The particle of claim 7 wherein the inner and the outer layer are deposited by fluidized bed chemical vapor deposition.

9. The particle of claim 7 in which:
the inner layer is a metal selected from the group consisting of Ti, Nb, Zr, Hf, V, Ta, and their mixtures and alloys; and,
the outer layer comprises at least one element included in the substrate, and is in a form selected from the group of forms consisting of the element, a compound of the element, an alloy of the element, and mixtures, compounds and alloys of a plurality of elements of the substrate.

10. The particle of claim 9 in which the outer layer is a carbide which will not melt during exposure to the beam during beam melting.

11. The particle of claim 9 in which the outer layer is based on a metal selected from the group consisting of Ni, Co, Cr, Fe, W, Al, Mo, Re and their mixtures and alloys.

* * * * *